July 4, 1967 B. L. DICKENS ET AL 3,329,760
TECHNIQUE FOR RECORDING A NARROW PULSE WITH VARIABLE DELAY
Filed Jan. 24, 1966
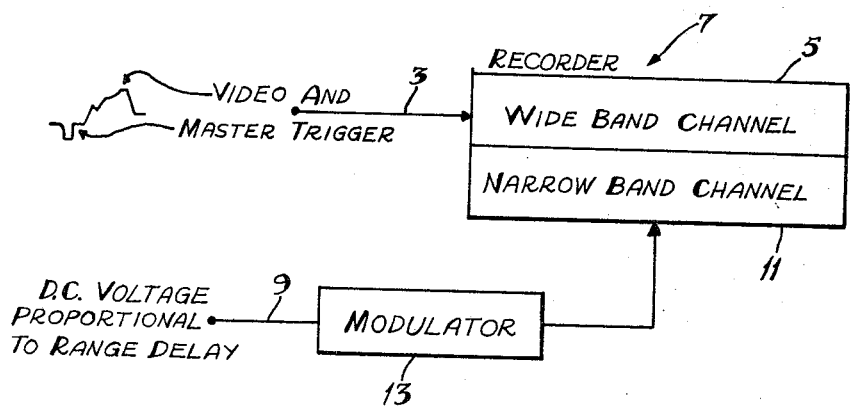
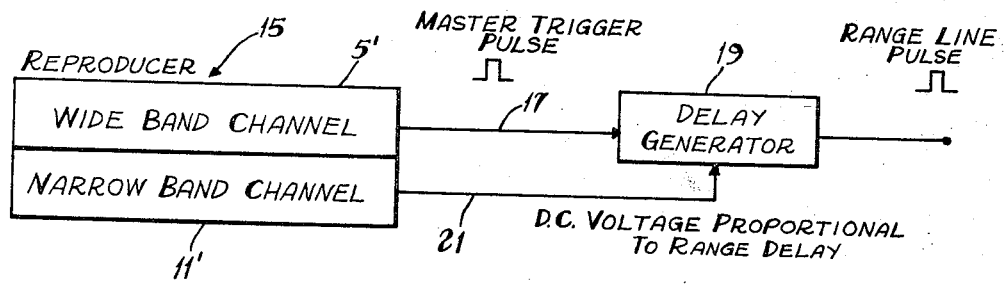
INVENTORS
BERNARD L. DICKENS, JOHN TOM,
HAROLD A. SMITH
BY
ATTORNEY 3,329,760
TECHNIQUE FOR RECORDING A NARROW PULSE WITH VARIABLE DELAY
Bernard L. Dickens, Cherry Hill, N.J., John Tom, Philadelphia, Pa., and Harold A. Smith, Chester Depot, Vt., assignors, by mesne assignments, to the United States of America as represented by the Secretary of the Navy
Filed Jan. 24, 1966, Ser. No. 522,791
7 Claims. (Cl. 35—10.4)

ABSTRACT OF THE DISCLOSURE

A radar range line pulse simulating apparatus and method characterized by recording a master trigger signal on a wideband channel of a conventional recorder, and recording a DC voltage which is proportional to a range delay on a narrow-band channel and reproducing said signals over separate outputs in a conventional manner, and coupling them to a variable delay generator which controls the time delay of the master trigger signal as a function of the range delay voltage, thereby providing at the output of the variable delay generator the range line pulse.

---

This invention relates to radar simulators and more particularly to the realistic simulation of radar range line pulses.

In the training of radar operators it is common to utilize, instead of operational equipment, various radar simulators which simulate operational conditions. One technique for simulating radar conditons, is by actually simulating the various signals, such as the video signal, which includes background noise, target pulse, etc., and feeding said signals with the necessary structural changes made thereto, into an operational radar receiver, or by feeding said signals into a simulated radar unit having the necessary circuitry to utilize and display them on its visual display. These signals may be realistically simulated by first actually recording an operational radar's signals, for its various modes, such as track, search, etc., and then utilizing these recorded signals as described previously. However, various problems have been encountered with the recording method. These problems include interference in the video signal, and spurious triggering signals being present in the recording, resulting in unreliable operation, and in particular, the range line presentation on the radar simulator's display being inadequate.

Accordingly, one of the objects of the present invention is to provide an improved radar simulator which is capable of generating a realistic range line pulse on the visual display of the radar simulator.

Another object of the present invention is to provide a method whereby a realistic range line pulse is recorded and simulated.

It is a further object of the persent invention to provide a system which is capable of accurately and realistically simulating a range line pulse.

The above results are achieved, generally, by recording a master trigger signal on a wideband channel of a ocnventional recorder, and recording a DC voltage which is proportional to a range delay on a narrow-band channel and reproducing said signals over separate outputs in a conventional manner, and coupling them to a variable delay generator which controls the time delay of the master trigger signal as a function of the range delay voltage, thereby providing at the output of the variable delay generator the range line pulse.

Other objects and many of the attendant advantages of this invention will be readily appreciated as the same becomes better understood by reference to the following detailed description when considered in connection with the accompanying drawings wherein:

FIG. 1 is a functional block diagram of the circuitry used to record the necessary radar signals; and FIG. 2 is a functional block diagram of the playback circuitry.

Referring to FIG. 1, video signals and a master trigger signal, which are recorded from a conventional operational radar (not shown), are coupled over line 3 to the wide-band channel 5 of recorder 7. Additionally, there is derived from said operational radar a DC voltage which is proportional to the range delay, which is the time interval between the master trigger pulse and the desired range line pulse which is coupled to the radar's indicator to mark or indicate relative range. Such range line or marker pulses are necessary in order to conveniently estimate range, and their generation and use is described in detail in "Radar System Fundamentals," NAVSHIPS 900,017, published by the Bureau of Ships, Navy Department, Washington, D.C., Apr. 1944, Section IX, pages 252–284. This voltage is coupled over line 9 to the narrow-band channel 11 of the recorder 7, after being converted into recordable information by a modulator 13, in accordance with any of the appropriate conventional low frequency recording techniques. For example, the DC signal corresponding to the range delay could be fed to a conventional signal conditioning network, and then to a solid state commutator which utilizes pulse amplitude modulation. The output channel would then produce pulses, whose amplitude is proportional to its input. This signal would then be fed to a voltage control oscillator whose frequency, in the preferred embodiment, would be 22½ kilocycles. The output of the oscillator would then be frequency modulated, proportional to the instantaneous amplitude of the input signal. This resulting FM output signal would then be fed to the narrow-band recording channel 11 of the recorder 7, and subsequently recorded on a recording medium such as magnetic tape.

Referring to FIG. 2, the master trigger pulse, which is reproduced from the wide-band channel 5' of the reproducer 15 is coupled over line 17 to a conventional variable delay generator 19. The information reproduced from the narrow-band channel of 11' would be, after appropriate conversion (not shown), coupled to another input of the variable delay generator 19 over line 21 so as to time delay the master trigger pulse in proportion to the amplitude of the DC range delay voltage coupled thereto. The conversion necessary to derive the range delay voltages, which are DC signals whose magnitudes are proportional to the range delay, may be achieved in a conventional manner such as by demodulating the output signal from the narrow-band channel 11', and multiplexing it in a pulse modulator decommutator. This master trigger pulse is the master timing reference pulse for the entire system and is required in the playback portion of the mode of operation to initiate the ground generated sweeps (not shown). Such signal is used to trigger the variable delay generator 19 and is delayed as a function of the DC range delay control voltage coupled over line 21. Thus, there has been generated, at the output of the delay generator 19, a range line or marker pulse, which is synchronized with the original synchronizing pulse, the master trigger pulse, but delayed by an amount determined by the range delay signal.

Obviously many modifications and variations of the present invention are possible in the light of the above teachings. It is therefore to be understood that within the scope of the appended claims the invention may be practiced otherwise than as specifically described.

What is claimed is:

1. A system for realistically simulating a radar's range line pulse, supplied with video information signals, a master trigger pulse, and a range delay signal, comprising:
- first transmitting means, for transmitting said video information signals and said master trigger pulse,
- second transmitting means for transmitting said range delay signal,
- recording means having a wide-band and a narrow-band channel coupled to said first and second transmitting means, for recording said video information signals and said master trigger pulse on the wide-band channel and recording said range delay signal on the narrow-band channel,
- reproducing means, operatively connected to said recording means for reproducing said video information signals, said master trigger pulse, and said range delay signal,
- third transmitting means, coupled to said reproducing means for transmitting said reproduced master trigger pulse,
- fourth transmitting means, coupled to said reproducing means for transmitting said reproduced range delay signal, and
- delay means coupled to said third and fourth transmitting means for delaying said master trigger pulse as a function of said range delay signal, thereby generating a range line output pulse.

2. The device as in claim 1, wherein said delay means includes:
- a delay generator.

3. The device as in claim 2, wherein said delay generator includes:
- a variable delay generator.

4. The device as in claim 3, wherein said variable delay generator is triggered by said reproduced master trigger pulse and time delays it as a function of said range delay signal.

5. The device as in claim 1, wherein the range delay signal is a DC voltage proportional to the time delay between the master trigger signal and a desired range line pulse, and wherein said recording means includes:
- converting means, for converting said DC voltage range delay signal into form capable of being recorded on the narrow-band channel of said recording means.

6. A method of realistically simulating a range line pulse from a recording of video information signals and a master trigger pulse stored on a wide-band channel of a recording medium, and range delay signals stored on the narrow-band channel of a recording medium, comprising the steps of:
- reproducing, in electrical form, said master trigger pulse,
- reproducing, in electrical form, the range delay signal, and
- delaying said master trigger pulse as a function of range delay signal.

7. The method as in claim 6, wherein the range delay signals are DC voltages, and wherein the step of delaying said master trigger pulse is done as a function of the magnitude of the range delay signal.

References Cited

UNITED STATES PATENTS 3,181,139   4/1965   Milroy _____ 343—5

RODNEY D. BENNETT, *Primary Examiner.*

T. H. TUBBESING, *Assistant Examiner.*